United States Patent [19]
Bunyea et al.

[11] Patent Number: 5,718,985
[45] Date of Patent: Feb. 17, 1998

[54] BATTERY PACK RETAINING LATCH FOR CORDLESS DEVICE

[75] Inventors: Roderick F. Bunyea, Westminster; Alvydas P. Karasa, Fallston; Philip T. Miller, Lutherville; Allen P. Smith, Baltimore, all of Md.

[73] Assignee: Black & Decker Inc., Newark, Del.

[21] Appl. No.: 719,499

[22] Filed: Sep. 25, 1996

Related U.S. Application Data

[63] Continuation of Ser. No. 289,158, Aug. 11, 1994.
[51] Int. Cl.[6] .................................................. H01M 2/10
[52] U.S. Cl. .................... 429/97; 429/99; 429/100; 429/123; 292/341.15
[58] Field of Search .................. 429/97, 99, 100, 429/175, 123; 292/341.15

[56] References Cited

U.S. PATENT DOCUMENTS

| | | | |
|---|---|---|---|
| 2,415,694 | 2/1947 | Isabell et al. | 429/99 |
| 4,447,749 | 5/1984 | Reeb et al. | 429/96 X |
| 4,871,629 | 10/1989 | Bunyea | 429/97 |
| 5,122,427 | 6/1992 | Flowers et al. | 429/97 |

*Primary Examiner*—Stephen Kalafut
*Attorney, Agent, or Firm*—Harness, Dickey & Pierce, P.L.C.

[57] ABSTRACT

A battery retention latch (50, 140) comprises an annular ring member (52, 142), a release button (54, 172, 174) and a spring arm (156, 190, 192, 194, 196). The annular ring (52, 142) retains a battery pack (26) in a cordless device (20, 120) regardless of the annular orientation of the battery pack (26) about a casing axis. The spring arm (56, 190, 192, 194, 196) maintains the ring (52, 142) in a normally engaged position and upon depressing the push button (54, 172, 174), the battery (26) may be removed from the device (20, 120).

13 Claims, 5 Drawing Sheets

BATTERY PACK RETAINING LATCH FOR CORDLESS DEVICE

This is a continuation of U.S. patent application Ser. No. 08/289,158, filed Aug. 11, 1994.

FIELD OF THE INVENTION

The invention relates to cordless (i.e. battery operated) devices such as portable electronic devices, toys, power tools or kitchen appliances. More particularly, the present invention relates to a battery pack latching ring to retain the pack in the device.

BACKGROUND OF THE INVENTION

For the consumer market, most cordless devices have a battery pack made integrally in the device housing because of reduced cost, increased user convenience and sturdiness. However, because of the desire to provide consumer devices with detachable packs, simplifying the recycling of the packs, and the desire to provide a family of cordless devices using an interchangeable pack and a single charger, there is a desire to use such a battery pack. Also, it is desirable to retain the battery pack in the device such that the battery pack may be easily coupled with the device and readily removable from the device. Of course, these design goals are not unique to consumer devices, but are equally desirable for professional cordless devices in which detachable packs have been standard for many years.

SUMMARY OF THE INVENTION

Accordingly, it is an object of the present invention to provide an improved battery pack latch to retain the pack in a cordless device embodying the foregoing design objectives.

In accordance with one aspect of the invention, a battery pack retention latch comprises at least one annular member to couple with the battery to retain it in the device, a release button formed with the at least one annular member, the release button is activated to move the annular member to a release position to enable the battery to be removed from the device, and a spring member to bias the annular member between its coupling or retention position and its release position. The spring member is coupled with the at least one annular member. Preferably, the at least one annular member is a continuous ring with the spring member and release button positioned opposing one another on the ring. The ring is divided into four portions with the first portion adapted to engage the battery pack to removably retain the battery pack in the device. Also, the spring member is an arm integrally formed with the first ring portion extending therefrom to bias the ring in a normally engaged position in the device.

In accordance with a second aspect of the invention, the at least one annular member is an open ring. Here, the annular ring has an overall open figure eight configuration divided into two ring sections having a continuous inner opening and open on one of its sides. Each ring section includes a release button and a spring member and the spring and release member oppose one another on the ring sections. Each ring section has an overall C shape with the Cs being connected to one another in opposing fashion (forming the open figure eight), continuous at one end and open at the other. Each of the C shaped ring sections includes an arcuate flange integrally formed with an engaging portion of the C shaped ring section. The flange engages the battery pack to retain the battery pack in a device on the latch. The spring member includes a pair of spring arms extending from the engaging portion of the C shaped ring section.

In accordance with a third aspect of the invention, a cordless device comprises a cavity with a receptacle in the cavity, a battery pack removably located in the cavity with the battery pack including a mechanism for electrically coupling with the receptacle and the device including a retention latch in accordance with either the first or second aspect of the invention described above.

In accordance with a fourth aspect of the invention, a cordless device comprises a cavity with a receptacle in the cavity, the receptacle is adapted to receive a battery and the device includes a retention latch in accordance with either the first or second aspect of the invention described above.

The cordless device includes at least one projection to support the spring member in its normally engaged position and to locate the latch within the device. The device also includes at least one pair of opposing openings in it to enable grasping of the battery pack to remove the battery pack from the cordless device.

In accordance with a fifth aspect of the invention, a method of removing a battery from the device comprises providing a cordless device in accordance with the third aspect, activating the release button and removing the battery.

In accordance with a sixth aspect of the invention, a cap for a battery pack comprises a cylindrical wall with an exterior surface and an interior diameter to fit onto the battery pack and a groove in the exterior surface to engage a retention latch in accordance with either the first or second aspect of the invention described above.

Additional objects and advantages of the invention will be apparent from the detailed description of the preferred embodiment, the appended claims and the accompanying drawings or may be learned by practice of the invention.

BRIEF DESCRIPTION OF THE DRAWINGS

The accompanying drawings, which are incorporated in and constitute a part of the specification, illustrate two embodiments of the present invention and together, with the description, serve to explain the principles of the invention. In the drawings, the same reference numerals indicate the same parts.

FIG. 13 is a cross sectional view of FIG. 14 along line 15—15 thereof.

DETAILED DESCRIPTION OF THE PREFERRED EMBODIMENT

The preferred embodiment of the present invention is a cordless (i.e. battery operated) device, such as a portable electronic device, toy, kitchen appliance or power tool. Examples of such a device are a cordless screw driver 20 and drill 120 as shown in FIGS. 1, 2 and 8, 9, respectively. The preferred embodiment, more particularly, is an improved retention latch 50, 140 to retain battery packs 26 in the device 20, 120.

Figure 1:
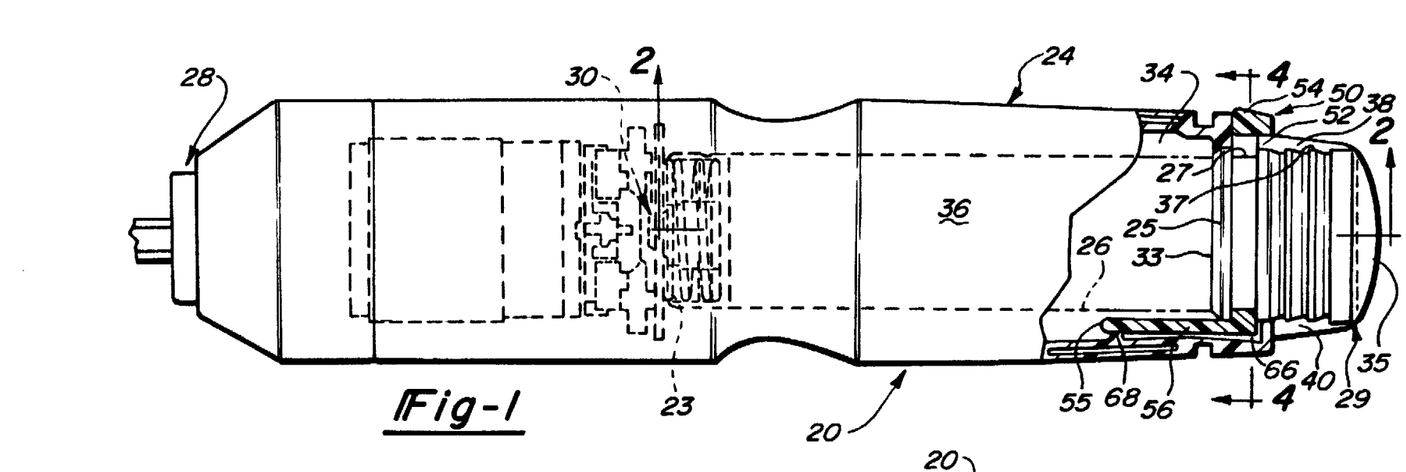
FIG. 1 is a side view, partially in cross section, of a cordless device in accordance with the present invention.
Figure 2:
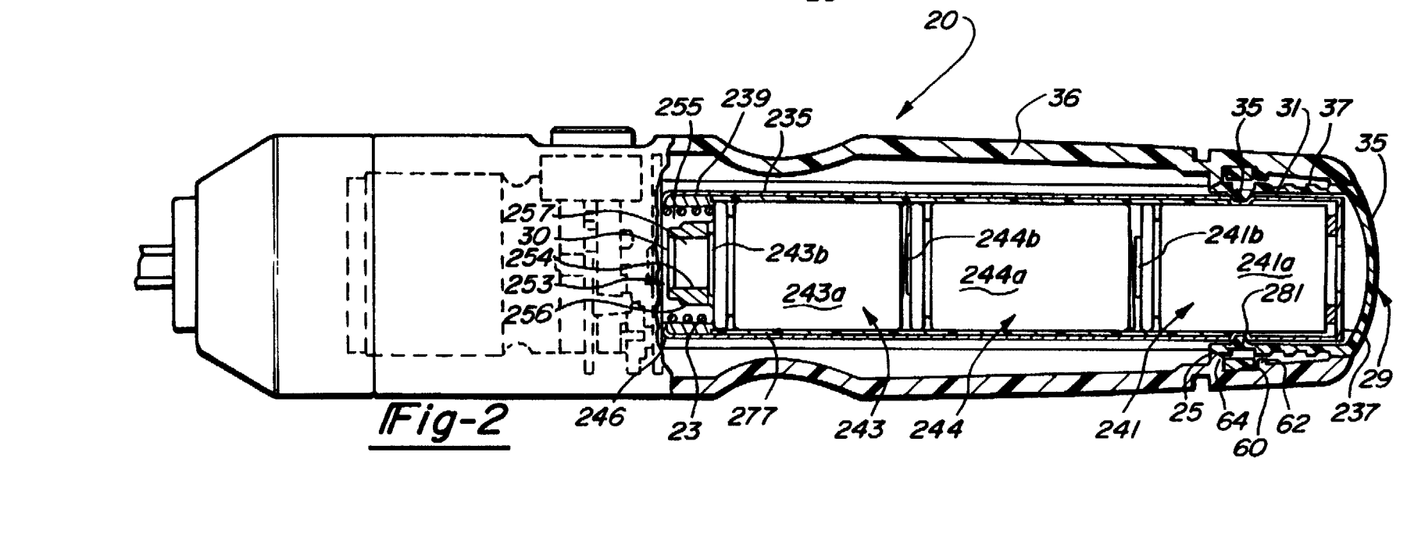
FIG. 2 is a cross sectional view of the cordless device of FIG. 1 along line 2—2 thereof.

As shown in FIGS. 1 and 2, in accordance with the present invention, a cordless device 20, herein exemplified as an in-line screw driver, comprises a housing 24 to receive a battery pack 26, a motor (not shown), an output spindle 28, a gear train (not shown) intermediate the motor and spindle, and a receptacle 30 to electrically connect battery pack 26 to the motor through a motor control circuit (not shown) including on and off and speed control switch 32. Housing 24 further includes a generally cylindrical cavity 34 and a handle portion 36 of the housing 24 to receive battery pack 26 in receptacle 30. Also, the housing 24 includes a pair of opposing housing openings 38 and 40 which enable removal of the battery pack 26 from the housing 24. Optionally, a spring 23 may be positioned in the housing cavity 34 to provide an ejection force to remove the battery pack from the housing upon removal of the retention force.

According to one aspect of the invention, the battery pack 26 is removably located in the cavity 34 and is electrically connectable to the receptacle 30 regardless of the angular orientation of the battery pack 26 about a longitudinal axis of symmetry of the pack 26 (this aspect of the invention is sometimes hereinafter referred to as the universal angular orientation feature). The pack 26 is thus easier to use and may be easily loaded in device 20 under adverse conditions such as in dim light or in cramped quarters.

Battery pack 26 is fully described in U.S. patent application Ser. No. 08/065,736 for "Battery Pack For Cordless Device", filed May 21, 1993, the specification and drawings of which are herein expressly incorporated by reference. Thus, a detailed description of the battery pack 26 will not be given and only those elements which are necessary for the description will be described.

Battery pack 26 comprises an elongated cylindrical tubular metal casing 235 having opposed rear and forward ends 237 and 239. A plurality of electrically connected mechanically disconnected cells 241, 243, 244 are disposed end to end in casing 235. For simplicity, pack 26 is illustrated in FIG. 2 with three cells 241, 243, 244. However, the present invention is equally applicable to packs including two or more cells. Each cell 241, 243, 244 has a cell can 241a, 243a, 244a for forming a first cell terminal and a button terminal 241b, 243b, 244b closing one end of the cell and forming a second cell terminal. As is conventional, the first or cell can terminal 241a, 243a, 244a is negative and the second or button terminal 241b, 243b, 244b is positive. The cells 241, 243, 244 are preferably nickel cadmium cells which are preferred for high discharge rate applications (5 to 30 amps) such as power tools and certain kitchen appliances. However, the present invention is also equally applicable to other rechargeable and primary cell couples such as nickel, metal hydride or primary alkaline cells.

The top 253 closes the casing forward end 239, is electrically connected to button terminal 243b and forms a second pack terminal 254. Top 253 is radially symmetrical about the casing axis and defines a cavity 255 in the casing forward end 239. A forwardly projecting nipple 257 formed on the top 253 is fully recessed within cavity 255 and terminates rearwardly to a forward edge of casing 235. Top 253 is electrically connected to and mechanically disconnected from forward cell 243 through engagement with button terminal 243b. As will be appreciated, first and second pack terminals 246, 254 and 255 have opposite polarities (preferably, negative and positive, positive, respectively), are coaxial with the casing axis and are located adjacent to the casing forward end 239 and, for those reasons, pack 26 is easily connectable in the cordless device 20 with receptacle 30 regardless of the angular orientation of the pack 26 about the pack axis. To electrically insulate each cell 241, 243, 244 from casing 235, the cells 241, 243, 244 are enclosed with an electrically insulated sleeve 277.

Figures 17, 18:
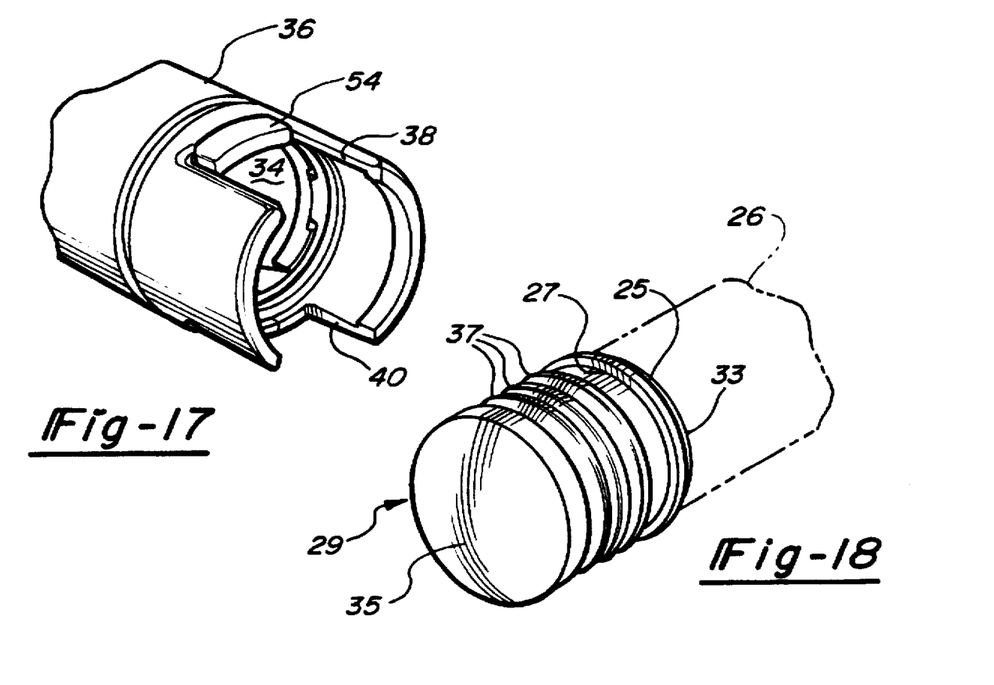
FIG. 17 is a partial perspective view of the cordless device of FIG. 1.
FIG. 18 is a perspective view of a cap in accordance with the present invention.

The cap 29 has a cylindrical wall 31 with an exterior surface and an interior diameter to fit over the metal housing of the battery pack 26. The cap 29 is secured to the pack 26. The cylindrical wall 31 has an open end 33 and a closed dome shaped end 35, however, the closed end could likewise be open. The dome end 35 acts as a shock absorber in the event the battery is dropped on a surface. Adjacent the open end 33 is an angled peripheral surface 25 on the external surface. The angle surface 25 acts as a cam to enable passage of the cap 29. A latch keeper groove 27 is formed in the external surface of the cylindrical wall 31 to provide an engaging recess for the retention latch 50, 140. Gripping members 37 are peripherally formed on the exterior surface of the cylindrical wall to aid in grasping of the cap 29 to remove the pack 26 from the housing 24. The cap includes a bead 39 on its interior surface to secure it with a recess 281 in the pack casing 235.

Figures 3, 4, 5, 6, 7:
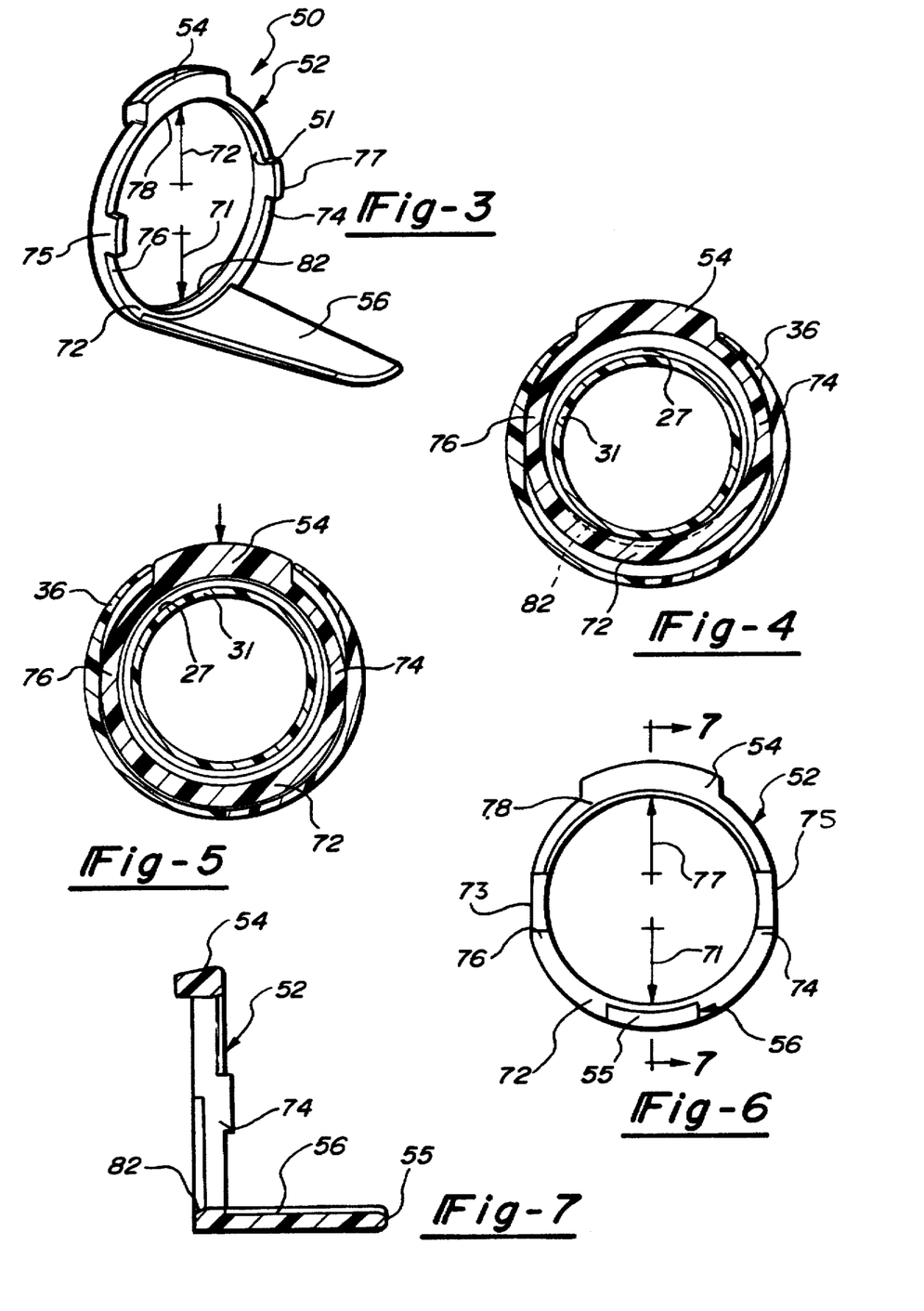
FIG. 3 is a perspective view of a retaining latch in accordance with the present invention.
FIG. 4 is a cross sectional view of FIG. 1 along line 4—4 thereof in an engaged position.
FIG. 5 is a view like FIG. 4, with the latching ring in a disengaged position.
FIG. 6 is a rear plan view of the latch of FIG. 3.
FIG. 7 is a cross sectional view of FIG. 6 along line 7—7 thereof.

The latch 50 is positioned transversely to the housing 24 to retain the battery 26 within the cavity 34. The latch 50 couples with a latch keeper groove 27 formed in the battery pack cap 29. The latch 50 includes a latch ring 52, a push button 54 and a spring means 56 coupled to latch ring 52. In this embodiment, spring means 56 is preferably constituted by forwardly extending cantilevered spring arm 56 and is for biasing latch ring 52 between a normally engaged position (FIG. 4) and a release position (FIG. 5). Alternatively, spring means 56 may be constituted by a torsion spring (not shown) coupled to one side of ring 52 or may be constituted by a first forwardly extending cantilevered spring arm and a second rearwardly extending cantilevered spring arm. The use of forwardly and rearwardly extending arms would be desirable in devices that can accommodate a latch of greater length and would have the advantage that the mounting of latch ring 52 would be more stable and balanced. The ring 52 is positioned within the housing 24 in a groove 60 formed by a pair of radially inwardly extending walls 62, 64 in the housing 24 (FIG. 2). Also, the cantilevered spring arm 56 is located in a recess 66 in the housing 24. The distal end 55 of the spring arm 56 is supported on a housing projection 68 to locate the latch ring 52 in a normally engaged position. The spring constant of spring arm 56 may be easily varied by changing its shape and thickness. Also, the spring force of spring arm 56 may be easily varied by changing the height or location of projection 68. And thus, latch 50 may be easily adapted to the requirements of the embodiment shown in FIGS. 1–7 and other applications.

Turning to FIGS. 3 through 7, the latch 50 is shown. The latch ring 52 includes ring portions 72, 74, 76 and 78. The first ring portion 72 acts as the battery engaging portion which engages the latch keeper groove 27 formed in the battery pack cap 29. The spring arm 56 extends from this portion 72 of the ring 52. The ring portions 74 and 76 are transition portions and extend on each side of the continuous ring 52 and include reinforcement tabs. To guide movement of ring 52, each ring portion 74, 76 has a flat outer surface 75, 77 in sliding engagement with a respective inner flat web between sidewalls 62, 64. Fourth ring portion 78 opposes the first ring portion 72 and includes the unitarily formed push button 54. As can be seen in the figures, the ring 52 has an elliptical shape with a first radius 71 defining the arc of the first ring portion 72 with substantially parallel arcs or lines on the ring portions 74 and 76 and a second radius 77 defining the arc of the fourth ring portion 78. The radii 71, 77 of the first and fourth ring portions 72 and 78 are different such that the second 74, third 76 and fourth 78 ring portions do not engage the battery latch keeper groove 27 in an engaged or disengaged position. Also, this design aids in the movement of the latch ring 56 such that when the push button 54 is pushed radially of the housing 24, the ring 52 is moved laterally downward without bowing its annular portion and is disengaged by flexing spring arm 56 in the housing recess 66. Thus, ring 52 is located in the disengaged position shown in FIG. 5. The annular portion of the ring 52 is guided by and prevented from bowing by the web between side walls 62, 64 of the housing 24, as seen in FIG. 2. Further, flat surfaces 75, 77 aid in reducing friction and prevent rotation of ring 52 about the longitudinal axis of handle 36.

The engagement ring portion 72 includes an angled cam surface 82 which assists to enable the battery 26 to pass through the ring 52 as the battery cap 29 contacts the cam surface 82, assisting the battery 26 to slide through the latch opening 51.

The latch 50 is ordinarily formed from a polymeric material such as acetel forming the latch 50 as a unitary one piece device. However, the latch 50 may be manufactured from several different parts pieced together to form a desired latch member. Also, the latch could be made of a metallic material or a metallic material coated with a polymeric material.

The distal end 55 of the arm 56 is supported on the housing projection 68 to locate the latch ring 52 in a normally engaged position (FIGS. 1, 2 and 4). Here, the first ring portion 72 of the ring 52 is engaged on or latched in the cap groove 27. When the push button 54 is pushed radially inward of the housing, ring 52 is moved laterally downward (without bowing its annular position) and is disengaged by flexing spring arm 56 into the recess 66. Thereby, ring 52 is located in the disengaged position shown in FIG. 6. The annular portion of the ring 52 is prevented from bowing by the radially inward housing web between side walls 62, 64 (FIG. 2).

To insert the battery pack 26 into the housing 24, the battery pack 26 is inserted into the housing 24 in any angular orientation and is freely slidable in the housing cavity 34 until the first latch ring portion 72 engages the forward tapered rim 25 of the battery cap 29. The rim 25 functions as a camming surface with the camming surface 82 of the first ring portion 72 and bends arm 56 outwardly as battery pack 26 is manually forced into the cavity 34. In this manner, ring 52 slides over rim 25 and is biased resiliently inward into the cap groove 27 by spring arm 56 to assume the engaged position shown in FIGS. 1, 2 and 4. To disengage battery pack 26, the release button 54 is pushed radially inwardly, normally by the user's thumb, to flex spring arm 56 into the housing recess 66. Thereafter, battery pack 26 can be pulled axially outwardly from the cavity 34 by the index finger on the same hand of the user by gripping or grasping the gripping members 37 of the cap 29 through one of the opposed housing openings 38, 40.

Figures 8, 9, 16:
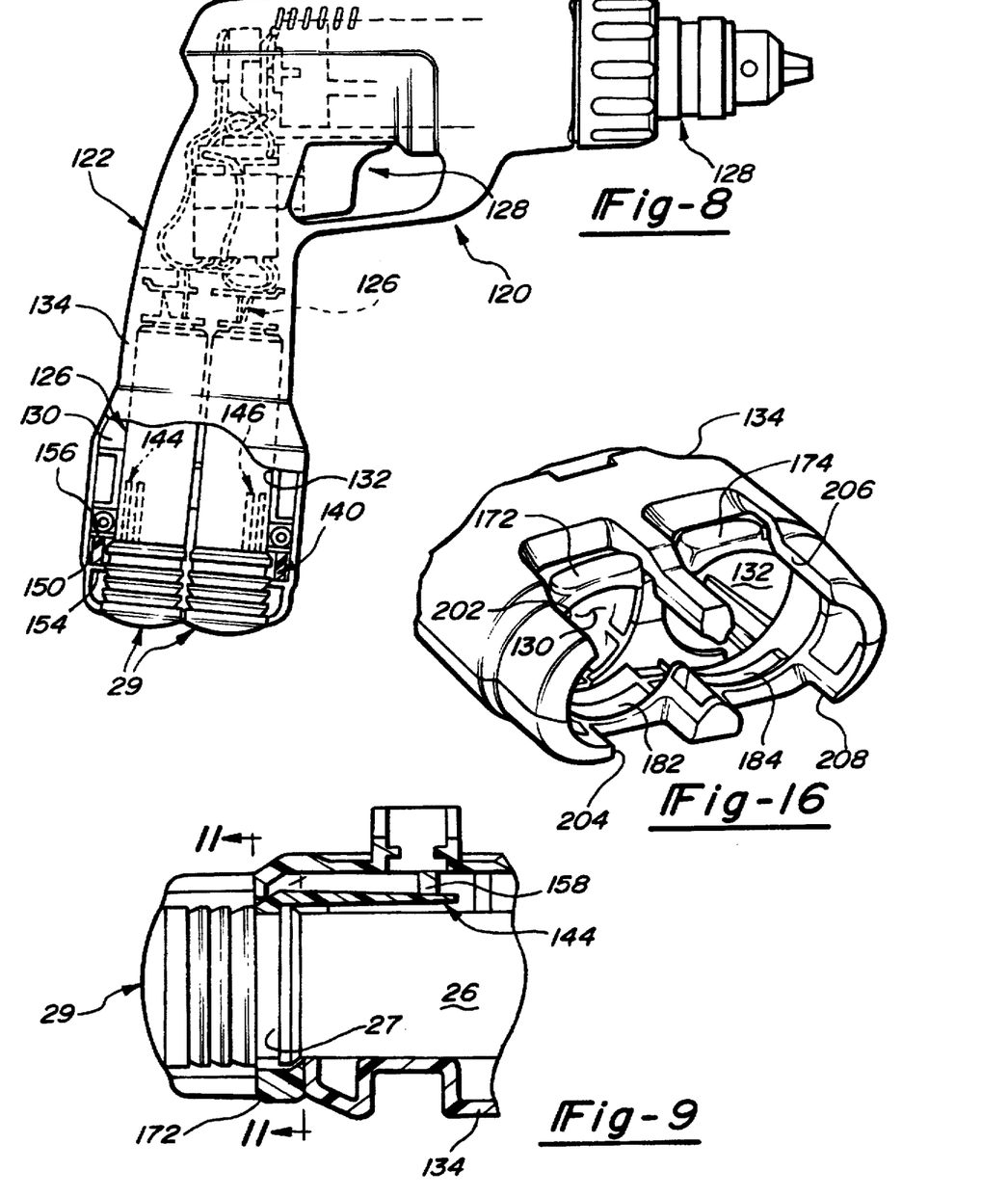
FIG. 8 is a side view partially in section of a second embodiment of a cordless device in accordance with the present invention.
FIG. 9 is a side plan view, partially in section, of the cordless device of FIG. 8.
FIG. 16 is a partial perspective view of the cordless device of FIG. 8.

In accordance with another feature of the present invention, cordless device 120, herein exemplified as a drill, comprises a housing 122 for receiving battery packs 26, a motor, not shown, an outer spindle 124, a gear train (not shown) intermediate the motor and spindle 124, and a receptacle 126 for electrically connecting the battery packs 26 to the motor through a motor control circuit (not shown), including on/off and speed control switch 128. Springs (not shown) like the one previously described could be used to provide an ejection force. Housing 122 further includes cylindrical cavities 130 and 132 in a handle portion 134 of the housing 122 to receive battery packs 26 in receptacle 128. The battery packs 26 are the same as those previously defined with the invention being directed to a retention latch 140 positioned within the housing handle 134.

Figures 11, 12, 13:
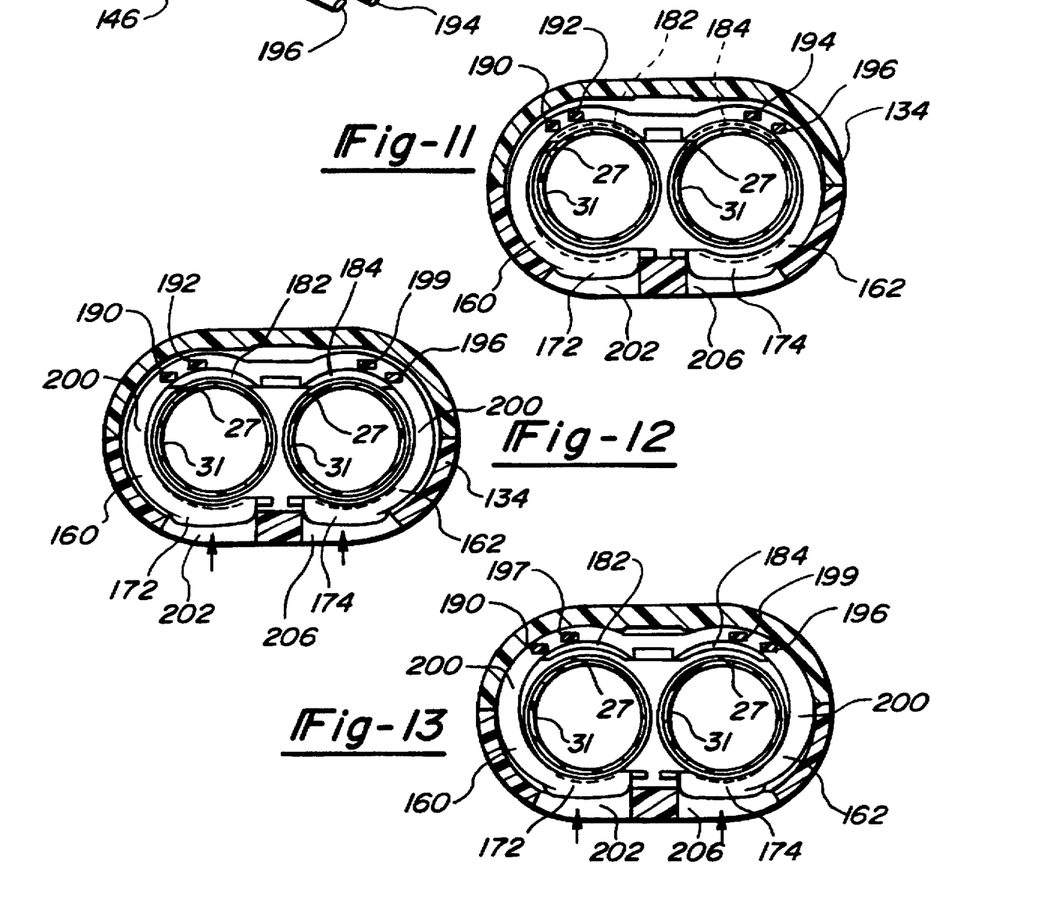
FIG. 11 is a cross sectional view of FIG. 8 along line 11—11, with the latch in an engaged position.
FIG. 12 is a view like that of FIG. 11 in a transition position.
FIG. 13 is a view like FIGS. 11 and 12 with the latch in a disengaged position.

The latch 140 comprises a latch double ring 142 mounted in the drill handle 134 and latch keeper grooves 27 formed in the battery pack caps 29. The double ring 142 is located transversely of the handle 134 and is coupled to a spring means 144, 146 for biasing latch ring 142 between a normally engaged position (FIG. 11) and a release position (FIG. 12). In this embodiment, spring means 144, 146 is preferably constituted by a pair of forked cantilevered spring arms 144, 146. As in the case of the embodiment shown in FIGS. 1–7, the spring means may also be constituted by a torsion spring or by forwardly and rearwardly extending spring arms. The ring 142 is seated in a transverse channel 150 defined by a pair of radially extending parallel spaced walls 154 and 156 and is laterally slidable in a plane perpendicular to the battery pack axes. The spring arms 144 and 146 are supported on projections 158 on the interior of the handle 134 to locate the latch ring in a normally engaged position, as shown in FIGS. 8, 9 and 11.

Figure 10:
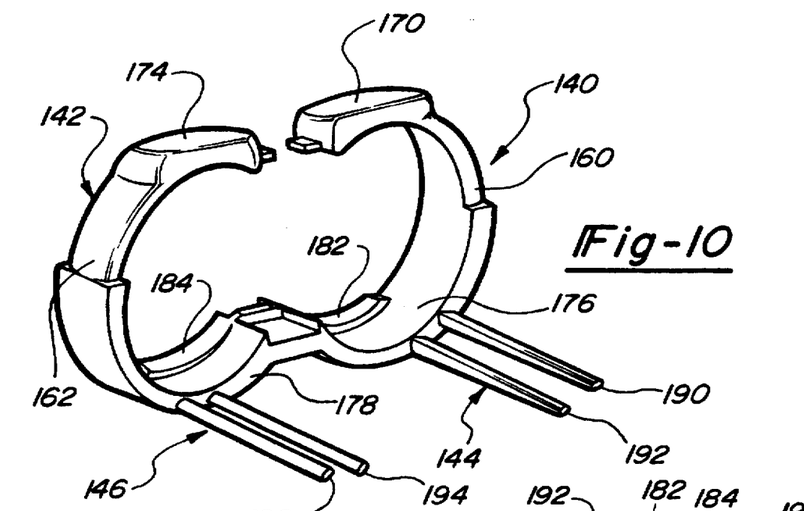
FIG. 10 is a perspective view of a second embodiment of a retaining latch ring in accordance with the present invention.
Figure 14:
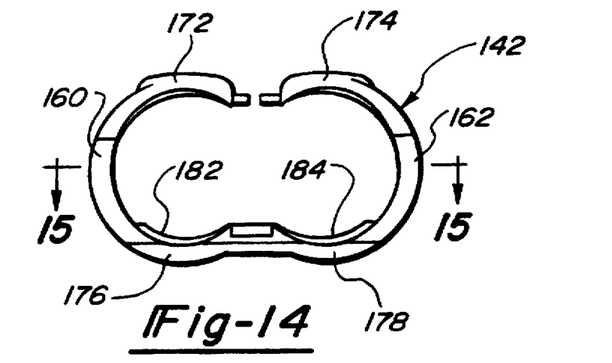
FIG. 14 is a front plan view of the latch in accordance with the present invention.
Figure 15:
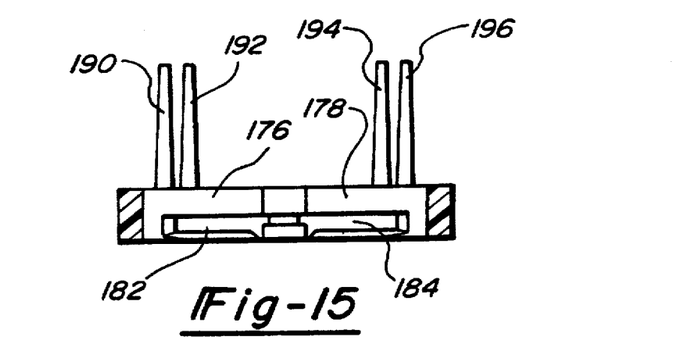

As shown in the figures, the double ring 142 has an overall open figure eight configuration which is open inside the annular regions. Each ring 160, 162 is C shaped, being connected at one end 164, 166 and being free at the other 168, 170. The free ends 168, 170 of the rings 160, 162 include an integrally or unitarily formed push button 172, 174 which enables movement of the latch rings 160, 162. Opposing the push buttons 172, 174 are engagement portions 176 and 178 of the C shaped rings 160, 162. The engagement portions 176 and 178 include integrally or unitarily formed arcuate flanges 182 and 184 that are latched, respectively, in the battery pack grooves 27. The spring arms 144, 146 extend from the engaging portion 176, 178 of the C shaped rings 160, 162. Thus, the arms 144, 146 also oppose the push button members 172, 174. Further, preferably each spring arm 144, 146 includes a pair of arms 190, 192, 194, 196. As mentioned above, the pair of arms 190, 192, 194, 196 are supported on projections 158 to locate the latch ring 142 in a normally engaged position as shown in FIG. 11.

As seen in FIGS. 11 and 12, the pair of integrally formed arcuate flanges 182, 184 are latched, respectively, in cap grooves 27. The latch 140 is designed such that the battery packs 26 can be selectively removed one at a time. To disengage one of the packs 26, the push button 172 is pushed laterally towards the battery pack 26 by the user's thumb to disengage the flange 182 from the cap groove 27 by primarily resiliently bending the spring arms 190, 192. The annular portions of the ring 142 are designed such that the bending of the annular portions 160 is slight when flexing the spring arms 190, 192. Also, the ring 160 may pivot slightly about a point 200 when disengaging the flange 182 from the groove 27. Thus, the battery 26 may be removed from the cavity 130 by gripping or grasping with the index finger of the same hand the gripping member 37 of the cap 29 through one of the opposed housing openings 202, 204. Regardless, the other flange 184 remains engaged in the groove 27 when the push button 172 is pushed to the disengagement position. The other battery pack 26 is removable from the handle 134 by pushing the other push button 174 to disengage the flange 184 from the groove 27 in an analogous manner. Likewise, the cap 29 would be gripped with an index finger through one of the opposing housing openings 206, 208.

To insert the battery packs 26 in the handle 134, the pack 26 is inserted into the handle 134 in any angular orientation and is freely slidable in the handle cavities 130, 132 until the flange 182, 184 engages the forwardly tapered rim 25 of the cap 29. The cap rim 25 functions as a camming surface and bends the spring arm 190, 192, 194, 196 outwardly as the battery pack 26 is manually forced into the cavity 130, 132. In this manner, flange 182, 184 of the ring 160, 162 slides over the cap rim 25 and is resiliently biased inward into the cap groove 27 by the spring arm 190, 192, 194, 196 and somewhat by the other spring arm 194, 196, 190, 192 to assume the engaged positioned shown in FIG. 11. The other battery pack 26 may be inserted into the cavity 132, 130 in the handle 134 in an analogous manner.

As mentioned above, the latch 140 can be manufactured from a plethora of materials, including polymeric materials such as nylon, metallic materials or metallic coated materials. Also, the latch 140 may be a unitary one piece device or it may be formed by several independent members.

By eliminating retention latch from the battery itself and positioning the latch within the housing, the batteries may be smaller and are able to nest with one another in a group in close proximity to one another. Also, the latch is more durable when enclosed in the housing, prohibiting easy break off like that which occurs when the latch is on the battery. Other advantages will be apparent to those skilled in the art.

It will be recognized that although latches 50, 140 have been described as preferably generally annular or circular, other configurations may be used consistent with the geometry of the device in which the latch is used. For example, rectangular and octagonal configurations may be used. Such configurations may also be open to form a generally C-shaped configuration, if desired.

It will be apparent to those skilled in the art that various modifications and variations may be made in the cordless device and latch of the present invention without departing from the scope or the spirit of the present invention. Thus, it is intended that the present invention cover these modifications and variations provided they come within the scope of the appended claims and their equivalents.

What is claimed is:

1. A cap for a battery comprising:
    a closed cylindrical wall having an external surface and an interior diameter adapted to fit onto a housing of a battery pack;
    a member extending radially inward from said interior diameter for securing said end to the housing; and
    a groove in said external surface, said groove adapted for receiving a latch for retaining the cap with the latch.

2. The cap according to claim 1, wherein said cylindrical wall includes at least one open end.

3. The cap according to claim 2, wherein an angled surface is peripherally formed on the external surface adjacent said open end, said angled surface adapted to act as a Cam to spread the latch to retain the cap.

4. The cap according to claim 2, wherein said cylindrical wall has two ends, one of said ends being closed.

5. The cap according to claim 4, wherein said closed end is dome shaped.

6. The cap according to claim 1, wherein at least one gripping member is on said external surface.

7. A battery pack comprising:
    an elongated casing;
    a plurality of cells in the casing;
    a terminal assembly located at one end of the casing and a cap located on the other end of the casing;
    the cap including a cylindrical wall;
    a bead is formed on an interior surface of the cylindrical cap wall and is located in a recess in the casing to retain the cap on the casing; and
    an annular groove in the cylindrical wall adapted for receiving a latch for retaining the pack in a cordless device.

8. The pack of claim 7, wherein:
    the cap is slidable fitted on the casing; and
    the casing has an annular recess.

9. A cap for a battery comprising:
    a closed cylindrical wall having an external surface and an interior opening, said interior opening adapted to surround a housing of a battery and secure to the housing; and
    a groove in said external surface, said groove adapted to receive a latch within said groove for retaining the cap with a latch, said groove defining an abutment surface circumferentially surrounding said cylinder wall for abutting the catch.

10. The cap according to claim 9, wherein the groove has a width sufficient for receiving the latch.

11. The cap according to claim 9, wherein said cap includes a cam surface to spread the latch.

12. A cordless device comprising:
    a cavity;
    a receptacle in the cavity;
    a battery pack removably located in the cavity, said battery pack including means for electrically coupling with said receptacle and a cap having a cylindrical wall having an external surface and an interior diameter adapted to fit onto a housing of a battery pack and a groove in said external surface, said groove adapted for receiving a latch for retaining the cap with the latch;
    a latch for retaining said battery in said cavity, said latch including at least one annular member, said annular member engaging with the battery cap to retain said battery in said cavity;

a release member coupled with said at least one annular member, said release member adapted to be activated to move said annular member to a release position to enable the battery to be removed from the device; and spring means for biasing said annular member between a normally engaged position and its release position, said spring means coupled with said at least one annular member.

13. A battery pack comprising:

an elongated casing defining an axis;

a plurality of cells axially positioned in said casing;

a terminal assembly located at one end of the casing;

a cap including a cylindrical wall;

said cap positioned on said housing and surrounding a portion of said housing; and a groove in said cylindrical wall, said groove adapted for receiving a latch within said groove for retaining the pack in a cordless device, said groove defining an abutment surface circumferentially surrounding said cylinder wall for abutting the catch.

* * * * *